(12) United States Patent
Cheng

(10) Patent No.: US 11,102,114 B2
(45) Date of Patent: *Aug. 24, 2021

(54) METHOD, APPARATUS, AND COMPUTER-READABLE STORAGE MEDIUM FOR NETWORK OPTIMIZATION FOR ACCESSING CLOUD SERVICE FROM ON-PREMISES NETWORK

(71) Applicant: Alibaba Group Holding Limited, Grand Cayman (KY)

(72) Inventor: Gang Cheng, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,253

(22) Filed: Dec. 28, 2018

(65) Prior Publication Data

US 2020/0213228 A1   Jul. 2, 2020

(51) Int. Cl.
*H04L 12/741* (2013.01)
*H04L 12/46* (2006.01)
*H04L 29/08* (2006.01)

(52) U.S. Cl.
CPC .......... *H04L 45/74* (2013.01); *H04L 12/4633* (2013.01); *H04L 12/4641* (2013.01); *H04L 67/1006* (2013.01)

(58) Field of Classification Search
CPC . H04L 45/22; H04L 12/4641; H04L 67/1002; H04L 61/2592; H04L 12/4633; H04L 67/1097; H04L 45/74; H04L 67/1006
See application file for complete search history.

(56) References Cited

U.S. PATENT DOCUMENTS 6,757,291 B1  6/2004  Hu
7,321,925 B2  1/2008  Trethewey
7,650,427 B1 * 1/2010  Liu ..................... G06Q 20/401
                                                    370/237

(Continued)

FOREIGN PATENT DOCUMENTS

CN   104521195 A    4/2015
CN   107465590 A   12/2017

OTHER PUBLICATIONS

Translation of PCT International Search Report dated Mar. 26, 2020, from corresponding PCT Application No. PCT/CN2019/126622, 3 pages.

(Continued)

*Primary Examiner* — Yemane Mesfin
*Assistant Examiner* — Henry Baron
(74) *Attorney, Agent, or Firm* — Lee & Hayes, P.C.

(57) ABSTRACT

Apparatus and methods include receiving a first packet, the first packet including a first source Internet protocol (IP) address and a first destination IP address; adding a first outer header to the first packet to generate an encapsulated packet, the first outer header including a second source IP address and a second destination IP address; forwarding the encapsulated packet to a Server Load Balancer (SLB) associated with the second destination IP address; receiving a response packet from a front end server having a front end server private IP address; and saving the front end server private IP address to bypass the SLB.

17 Claims, 10 Drawing Sheets

(56) References Cited

U.S. PATENT DOCUMENTS

| | | |
|---|---|---|
| 8,416,692 B2 | 4/2013 | Patel et al. |
| 8,533,337 B2 | 9/2013 | Maldaner |
| 8,838,830 B2 | 9/2014 | Igelka |
| 9,092,271 B2 | 7/2015 | Murthy et al. |
| 9,246,998 B2 | 1/2016 | Kumar et al. |
| 10,313,402 B2 | 6/2019 | Liu |
| 2002/0143953 A1 | 10/2002 | Aiken, Jr. |
| 2003/0097405 A1 | 5/2003 | Laux et al. |
| 2005/0261985 A1* | 11/2005 | Miller .................... G06Q 10/06 709/223 |
| 2017/0099188 A1 | 4/2017 | Chang et al. |
| 2018/0139272 A1 | 5/2018 | Puri et al. |
| 2018/0176307 A1 | 6/2018 | Kancherla et al. |

OTHER PUBLICATIONS

Translation of PCT Written Opinion dated Mar. 26, 2020, from corresponding PCT Application No. PCT/CN2019/126622, 4 pages.

* cited by examiner

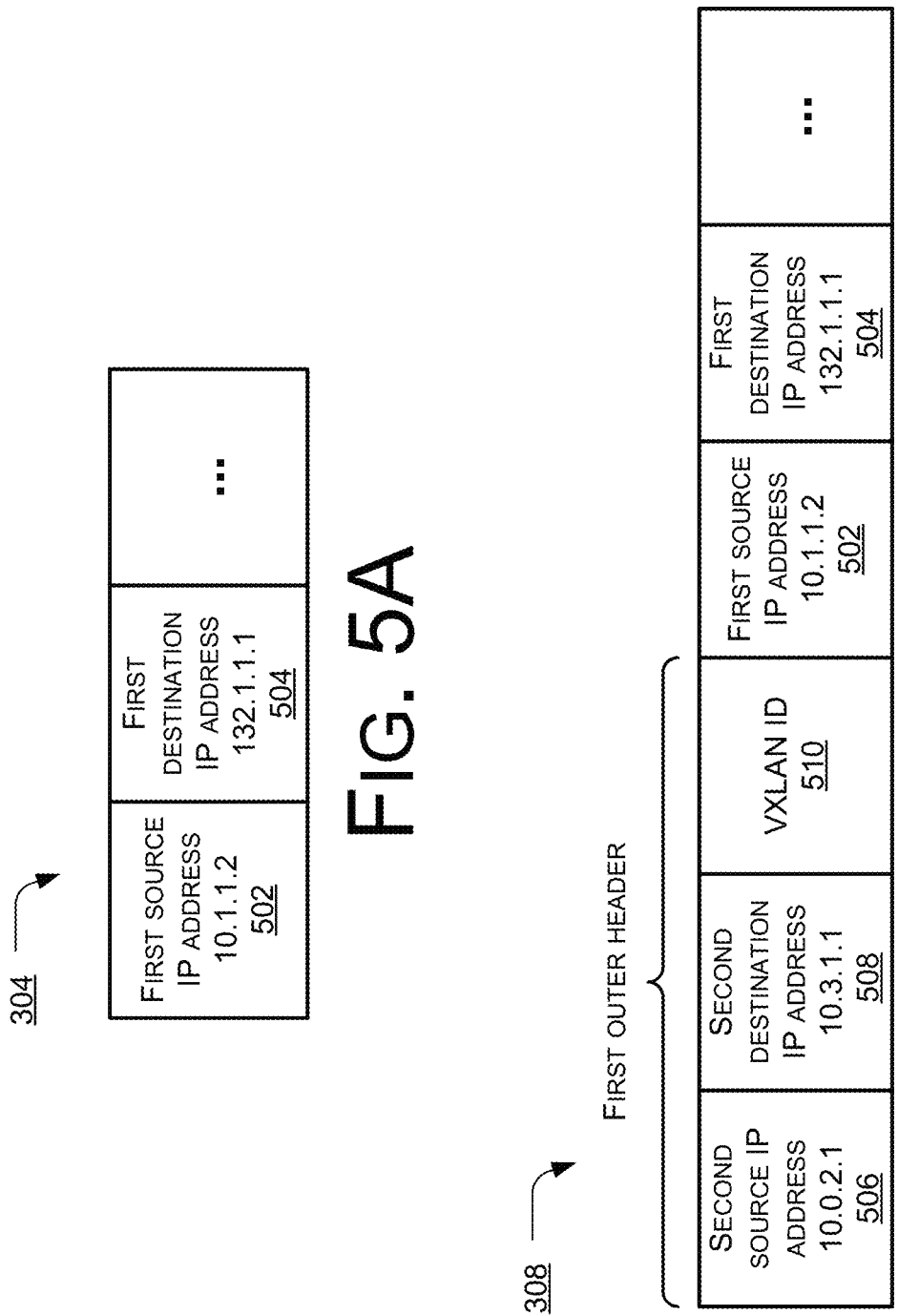

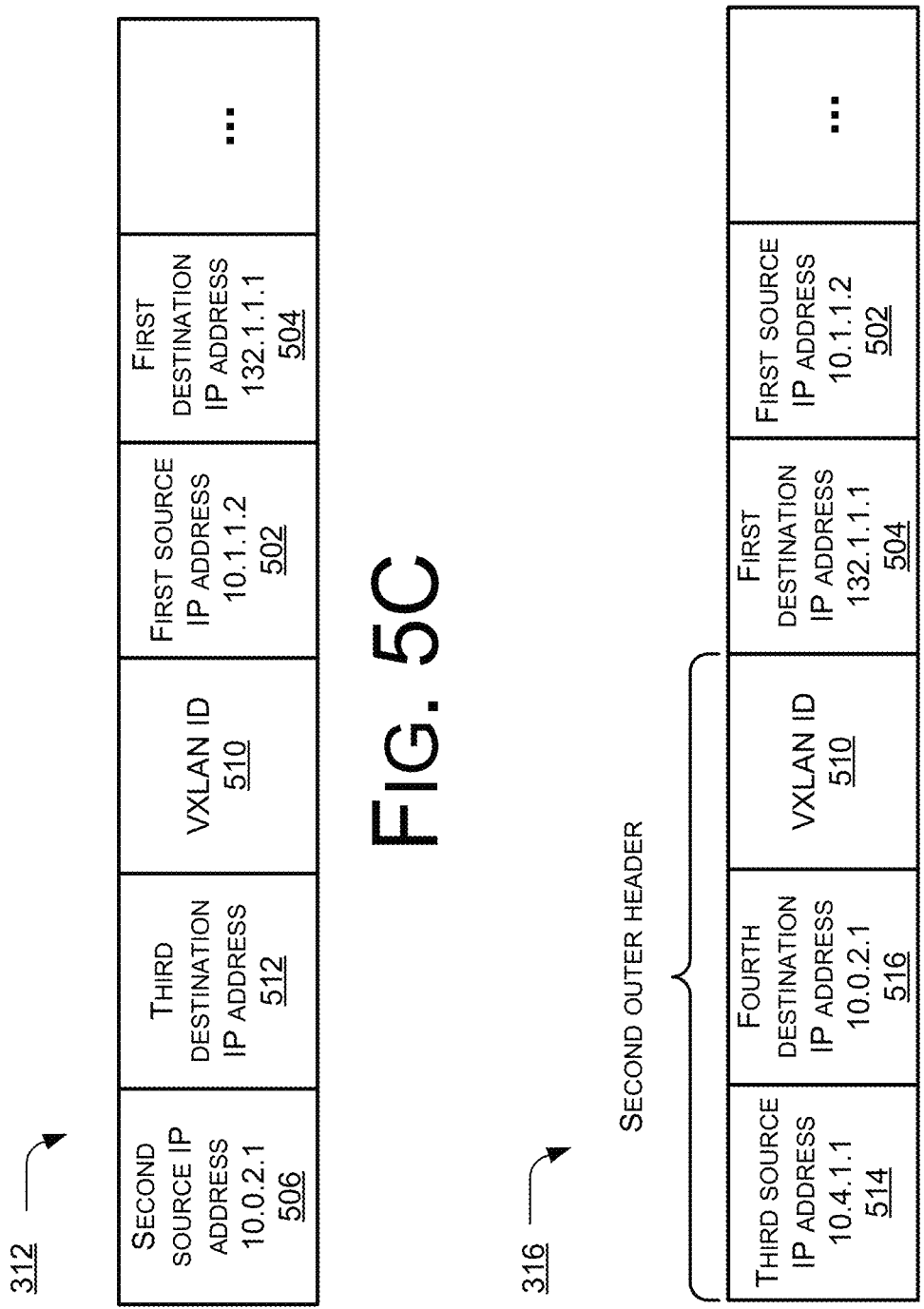

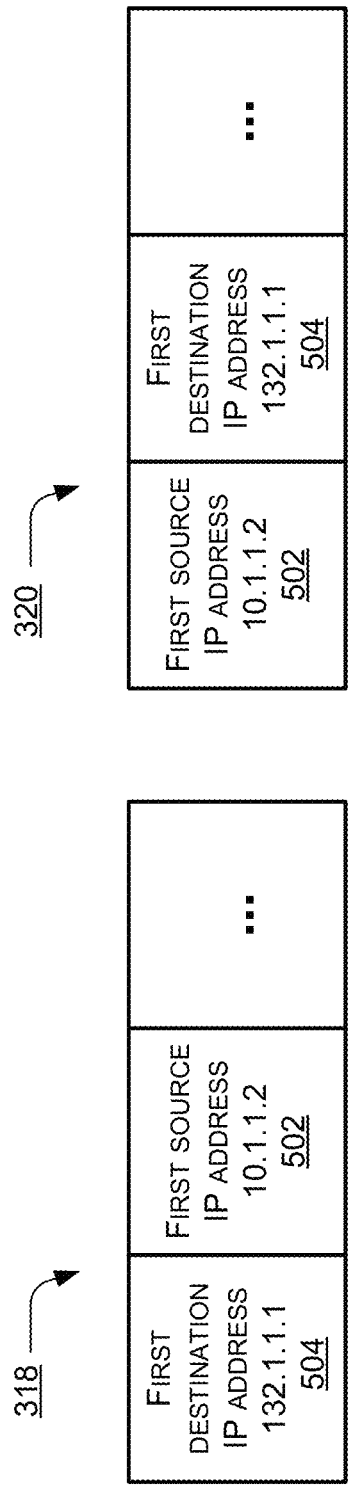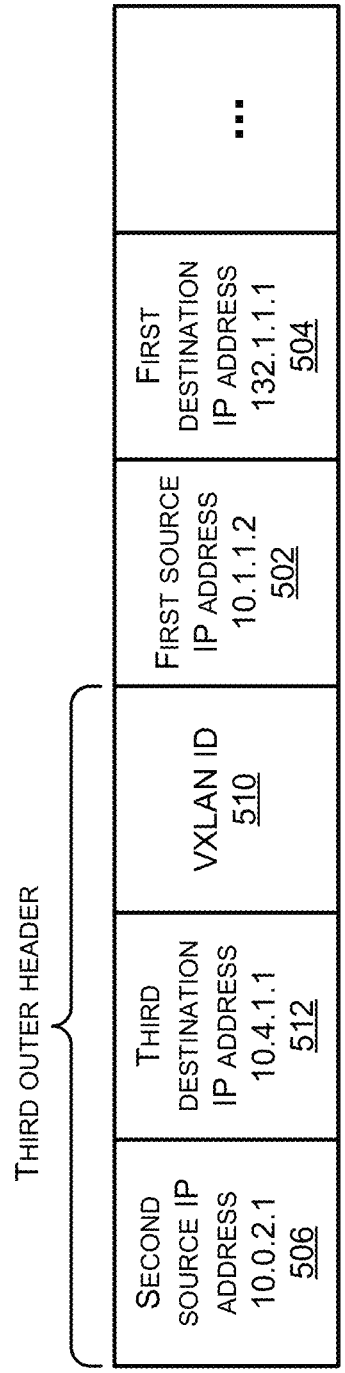

METHOD, APPARATUS, AND COMPUTER-READABLE STORAGE MEDIUM FOR NETWORK OPTIMIZATION FOR ACCESSING CLOUD SERVICE FROM ON-PREMISES NETWORK

BACKGROUND

Virtual Extensible Local Area Network (VXLAN) may be referred to as an overlay technology because it allows stretching Layer 2 connections over an intervening Layer 3 network by encapsulating (tunneling) data into a VXLAN packet. Devices that support VXLANs are called virtual tunnel endpoints (VTEPs), which encapsulate and de-encapsulate VXLAN traffic. The migration of virtual machines is enabled between servers that exist in separate Layer 2 domains by tunneling the traffic over Layer 3 networks. This functionality allows the user to dynamically allocate resources within or between data centers without being constrained by Layer 2 boundaries or being forced to create large or geographically stretched Layer 2 domains. Using routing protocols to connect Layer 2 domains also allows load-balance of the traffic to ensure that the user gets the best use of available bandwidth.

Enterprise customers can connect their on-premises network to the public cloud using a leased line-based hybrid network solution for good network performance and security. For example, an on-premises network may be connected to the cloud service through a hybrid gateway and a server load balancer (SLB). When accessing the public cloud service, all the incoming and outgoing traffic of the customer needs to go through the SLB. In other words, the cloud service is behind the SLB from the point of view of the customer.

Because the total cost increases along with the total capacity of SLBs, in practice, the total SLB capacity is preferably reduced to an affordable amount. Therefore, the SLB is usually implemented on a server which provides far less network throughput capability than regular network switches or routers. Thus, the SLB becomes the bottleneck which limits the accessibility of the cloud service from the customer. In case of large network traffic burst, the customer might experience packet loss or network congestion.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5A illustrates an example diagram showing the format of the first packet in FIG. 3.

FIG. 5B illustrates an example diagram showing the format of the encapsulated packet in FIG. 3.

FIG. 5C illustrates an example diagram showing the format of the third packet in FIG. 3.

FIG. 5D illustrates an example diagram showing the format of the fourth packet in FIG. 3.

FIG. 5E illustrates an example diagram showing the format of the fifth packet in FIG. 3.

FIG. 5F illustrates an example diagram showing the format of the sixth packet in FIG. 3.

FIG. 5G illustrates an example diagram showing the format of the seventh packet in FIG. 3.

DETAILED DESCRIPTION

Figure 1:
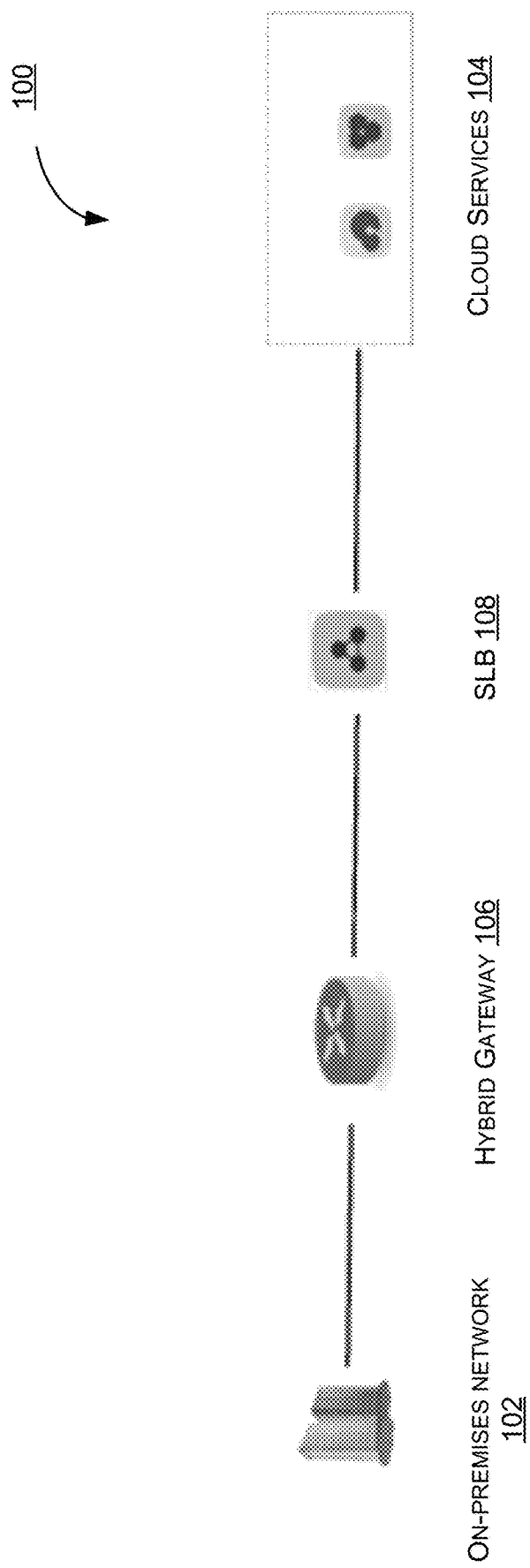
FIG. 1 illustrates an example diagram showing a network where the on-premises network is connected to cloud service with lease lines.

Apparatuses and methods discussed herein are directed to improving cloud service, and more specifically to network optimization for accessing cloud service from on-premises network.

Apparatuses and methods discussed herein may be usable to provide a system-level solution to minimize the total workload of SLBs needed for the traffic between the on-premises network and the cloud service. The speed of data transmission and thus the speed of processing associated with a user application that depends on the cloud service may be improved by reducing the network latency. Also, the network robustness of accessing the cloud service from the on-premises network may be improved for a hybrid user. The hybrid user is a user of hybrid cloud which is a cloud computing environment that uses a mix of on-premises, private cloud and third-party, public cloud services.

A hybrid gateway may receive a first packet. The first packet may include a first source Internet protocol (IP) address and a first destination IP address. The hybrid gateway may add a first outer header to the first packet to generate an encapsulated packet. The first outer header including a second source IP address, a second destination IP address. The hybrid gateway may forward the encapsulated packet to an SLB associated with the second destination IP address. The hybrid gateway may receive a response packet from a front end server having a front end server private IP address. In a system, some servers are designated for the purpose of receiving requests and sending them to other servers. The front end server may accept the requests connection from a user, then proxy the connection to a back end server on which the user's request may be served. The hybrid gateway may save the front end server private IP address.

The hybrid gateway may receive a second packet. The second packet including the first source IP address and the first destination IP address. The hybrid gateway may add a second outer header to the second packet to generate a bypass packet. The second outer header may include a third source IP address and a third destination IP address. The third destination IP address may be the front end server private IP address. The hybrid gateway may forward the bypass packet to the front end server associated with the front end server private IP address without first sending any information related to the second packet to the SLB prior to sending the bypass packet to the front end server, i.e., bypassing the SLB.

The first outer header to the first packet may be performed based on virtual extensible local area network (VXLAN) encapsulation.

The first outer header may further include a VXLAN ID. the second source IP address may be a hybrid gateway private IP address. The second destination IP address may be a SLB private IP address.

The first packet may be sent from an on-premises network. The first source IP address may be a private IP address of the on-premises network. The first destination IP address may be an IP address of cloud service.

The front end server private IP address may be saved in a session table.

The SLB may receive the encapsulated packet. The SLB may select the front end server associated with the front end server private IP address.

The SLB may replace the second destination IP address of the encapsulated packet with the front end server private IP address to generate a modified packet. The SLB may forward the modified packet to the front end server.

FIG. 1 illustrates an example diagram showing a network 100. The on-premises network 102 may be connected to cloud service 104 with lease or dedicated lines through a hybrid gateway 106 and a server load balancer (SLB) 108. When a hybrid user of the on-premises network 102 needs to access the cloud service 104, the hybrid user may send a data packet to the hybrid gateway 106. The hybrid gateway 106 may receive the packet and perform encapsulation, for example, the VXLAN encapsulation on the packet and send the encapsulated packet to the SLB 108. The SLB 108 may receive the encapsulated packet from the hybrid gateway 106 and replace the destination IP address of the encapsulated packet with the IP address of a selected front end server to generate a modified packet. The SLB 108 may send the modified packet to the selected front end server. The selected front end server may receive the modified packet and generate a response packet to serve the request from the hybrid user. The response packet may carry the private IP address of the selected front end server. The front end server may send the response packet to the SLB 108 which in turn forward the response packet to the hybrid gateway 106. The hybrid gateway 106 may forward the response packet to the hybrid user of the on-premises network 102. For the follow-up traffic from the hybrid user, such procedure may repeat.

Figure 2:
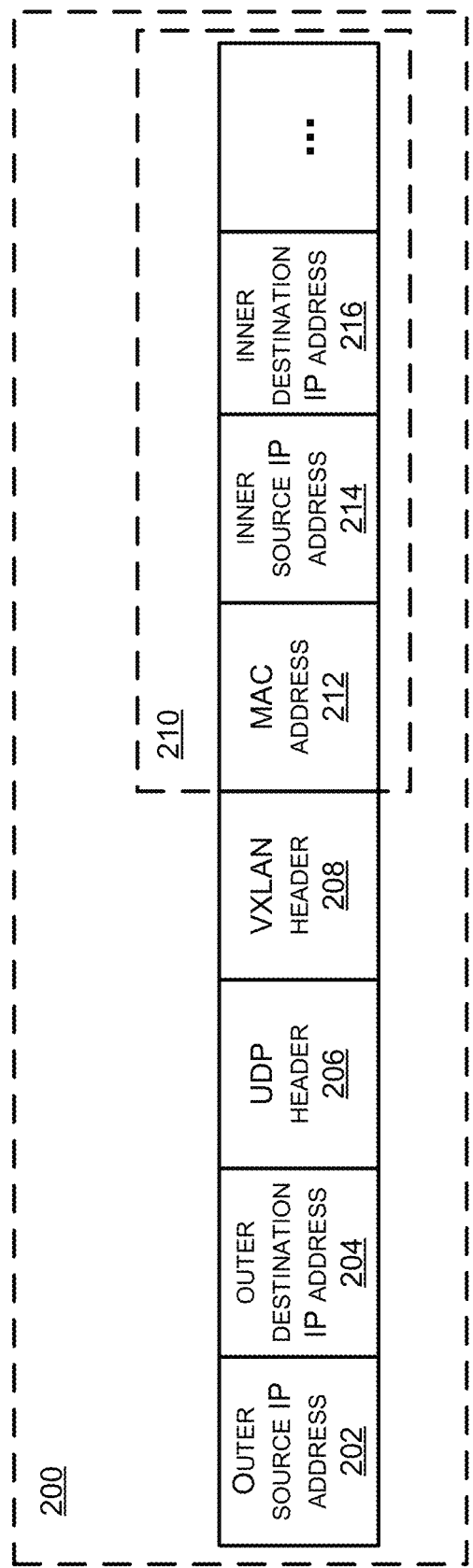
FIG. 2 illustrates an example diagram of the format of a VXLAN packet.

FIG. 2 illustrates an example diagram of the format of a VXLAN packet 200. Referring to FIG. 2, the VXLAN packet 200 may include the following components.

An outer source IP address 202 and an outer destination IP address 204 may represent the two endpoints address of the tunnel. A user datagram protocol (UDP) header 206 may carry a source port number and a destination port number of two endpoints of the tunnel. In general, the destination port of a UDP header may be a fixed value, for example, 8472 by default. A VXLAN header 208 may include a VXLAN ID. Each user, i.e., each tenant, may be assigned a unique 24-bits VXLAN ID in one data center (DC). A packet may use the VXLAN ID of a user as the VXLAN header to be forwarded to the user with this VXLAN ID. An inner packet 210 may include a MAC address 212, an inner source IP address 214, and an inner destination IP address 216, which may be carried by an original Layer-2 data packet.

Figure 3:
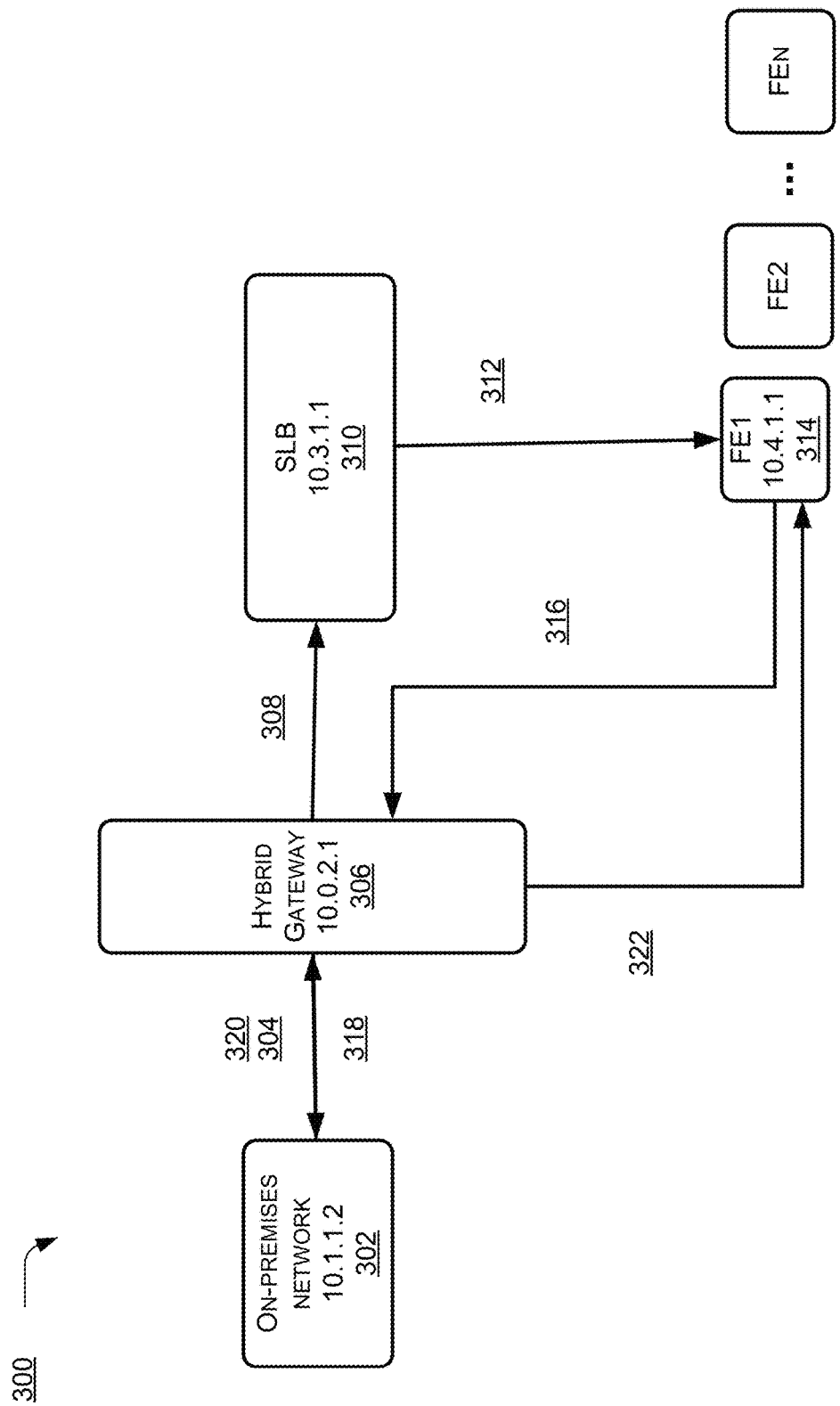
FIG. 3 illustrates an example diagram showing a system for optimizing accessing to cloud service from the on-premises user.

FIG. 3 illustrates an example block diagram showing a system 300 for optimizing accessing of cloud service from the on-premises user.

When a hybrid user of the on-premises network 302 needs to access the cloud service, the hybrid user may send out a first packet 304 to the hybrid gateway 306.

The hybrid gateway 306 may receive the first packet 304 from the on-premises network 302. The hybrid gateway 306 may perform encapsulation, for example, VXLAN encapsulation on the first packet 304 by adding a first outer header to generate an encapsulated packet 308. Also, the encapsulation of the first packet 304 may be performed based on other protocols or standards. The hybrid gateway 306 may send the encapsulated packet 308 to the SLB 310.

The SLB 310 may receive the encapsulated packet 308 from the hybrid gateway 306. The SLB 310 may select a front end server 314 from a plurality of front end servers. The selection of the front end server may be performed randomly or based on any suitable criteria. The selected front end server 314 may have a private IP address, for example, 10.4.1.1. Each front end server FE1, FE2, . . . , FEn may have its own private IP address, for example, 10.4.1.1, 10.4.1.2, . . . , 10.4.1.n. The SLB 310 may perform a destination network address translation (DNAT) on the encapsulated packet 308 by replacing the second destination IP address with a third destination IP address to generate a modified packet 312. The third destination IP address may be the private IP address of the selected front end server 314. The SLB 310 may send the modified packet 312 to the selected front end server 314.

The selected front end server 314 may receive the modified packet 312 from the SLB 310. The selected front end server 314 may serve the request of the hybrid user and generate a response packet 316 based on the modified packet 312. The response packet 316 may include a second outer header. The selected front end server 314 may send the response packet 316 to the hybrid gateway 306.

The hybrid gateway 306 may receive the response packet 316 from the selected front end server 314. The hybrid gateway 306 may remove the second outer header of the response packet 316 to generate a modified response packet 318. The hybrid gateway 306 may save the private IP address of the selected front end server 314 in a session table. Also, the private IP address of the selected front end server 314 may be saved in a memory, a storage device, or any other suitable location. The hybrid gateway 306 may forward the modified response packet 318 to the hybrid user of on-premises network 302.

Additionally or alternatively, the session table may save other information for the hybrid gateway to determine whether other data packets from a user will be sent to this address of the front end server. For example, information about relationship between the user and the front end server may be set up. A first user may correspond to a first front end server, a second user may correspond to a second server, an $n^{th}$ user may correspond to an $n^{th}$ server, etc., where n may be a positive integer. The session table may be specific to a particular user or may be used for different users. Moreover, the session table may include an entry indicating that a bypass may be made. This entry may be expired after a predetermined period of time or after a predetermined number of packets from the same user are sent, etc. The predetermined period of time and the predetermined number may be set and adjusted as necessary. Under certain conditions, for example, after the predetermined period of time or after the predetermined number of data packets are sent, the load balancing may be performed to make sure the selected front end server is not overloaded or another server that has no job task is available for the user, etc.

The hybrid user of on-premises network 302 may send a second packet 320 to the hybrid gateway 306.

The hybrid gateway 306 may receive the second packet 320 from the on-premises network 302. The hybrid gateway 306 may obtain the private IP address of the selected front end server 314 saved in the session table or any other proper locations. The hybrid gateway 306 may encapsulate the second packet 320 to generate a bypass packet 322 by adding a third outer header. The third outer header may include the third destination IP address which is the private IP address of the selected front end server 314. The hybrid gateway 306 may send the bypass packet 322 to the selected front end server 314 directly, bypassing the SLB 310.

Figure 4A:
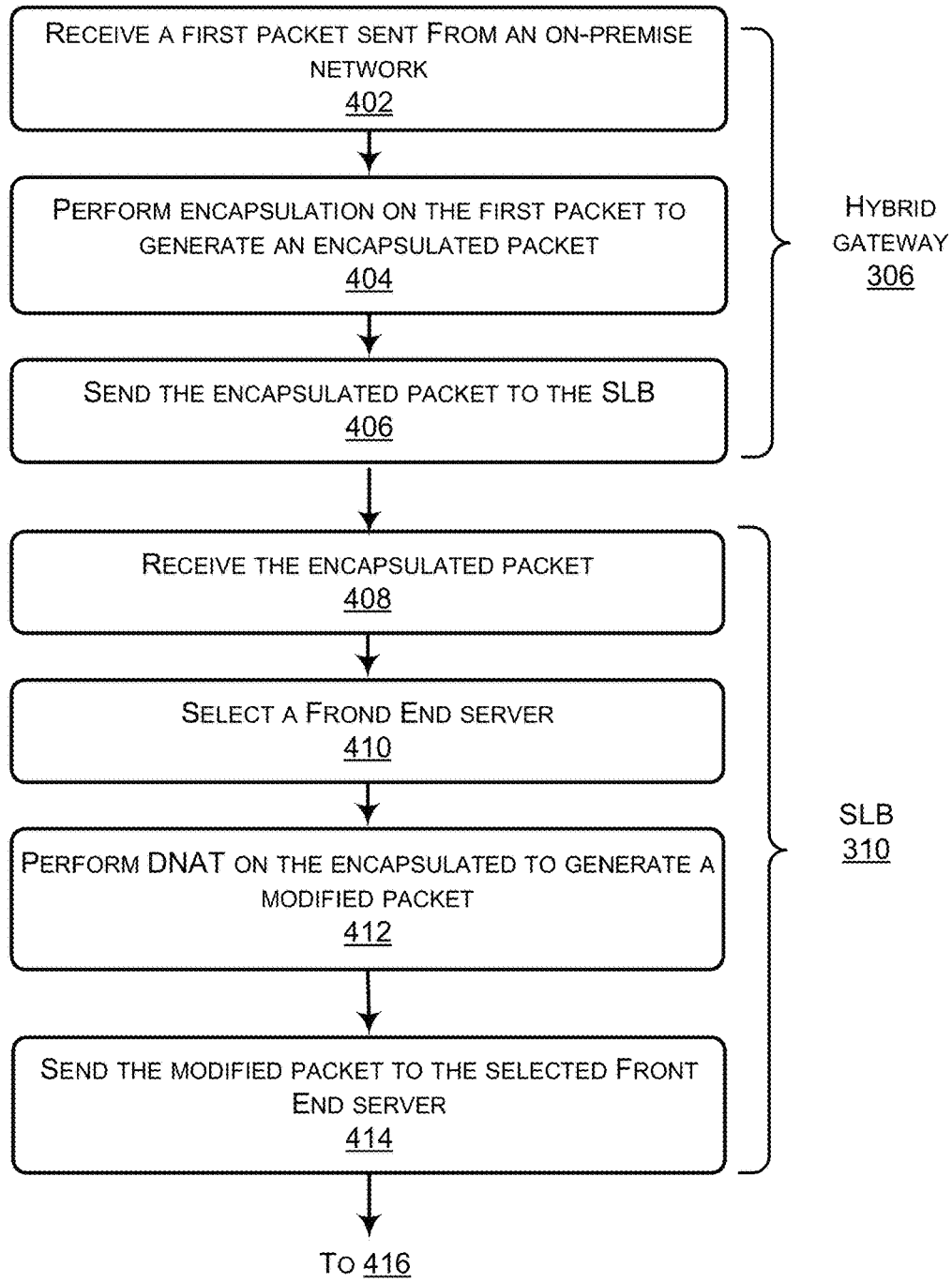
FIGS. 4A, 4B, and 4C illustrate example flowcharts of a method for optimizing network accessing to cloud service.
Figure 4B:
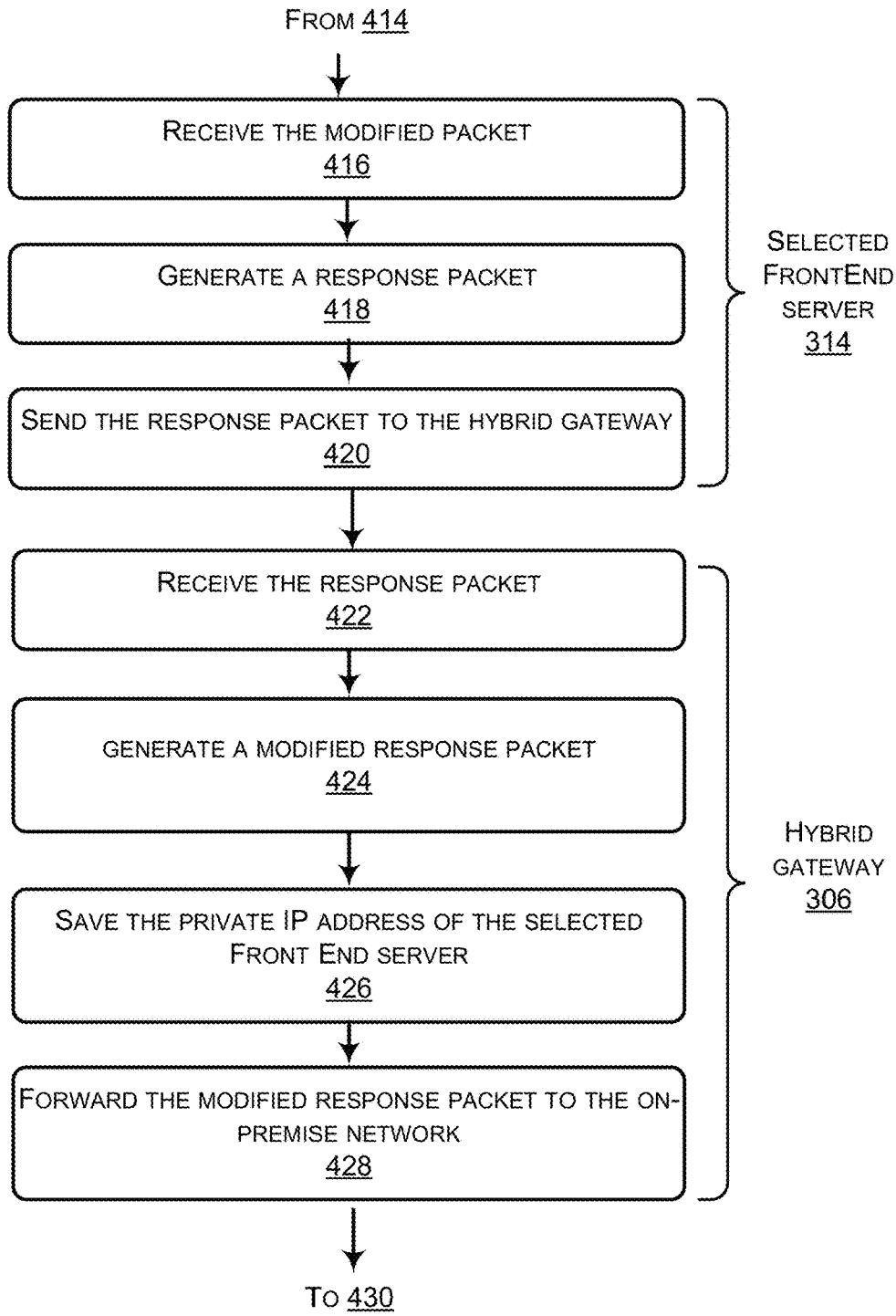
Figure 4C:
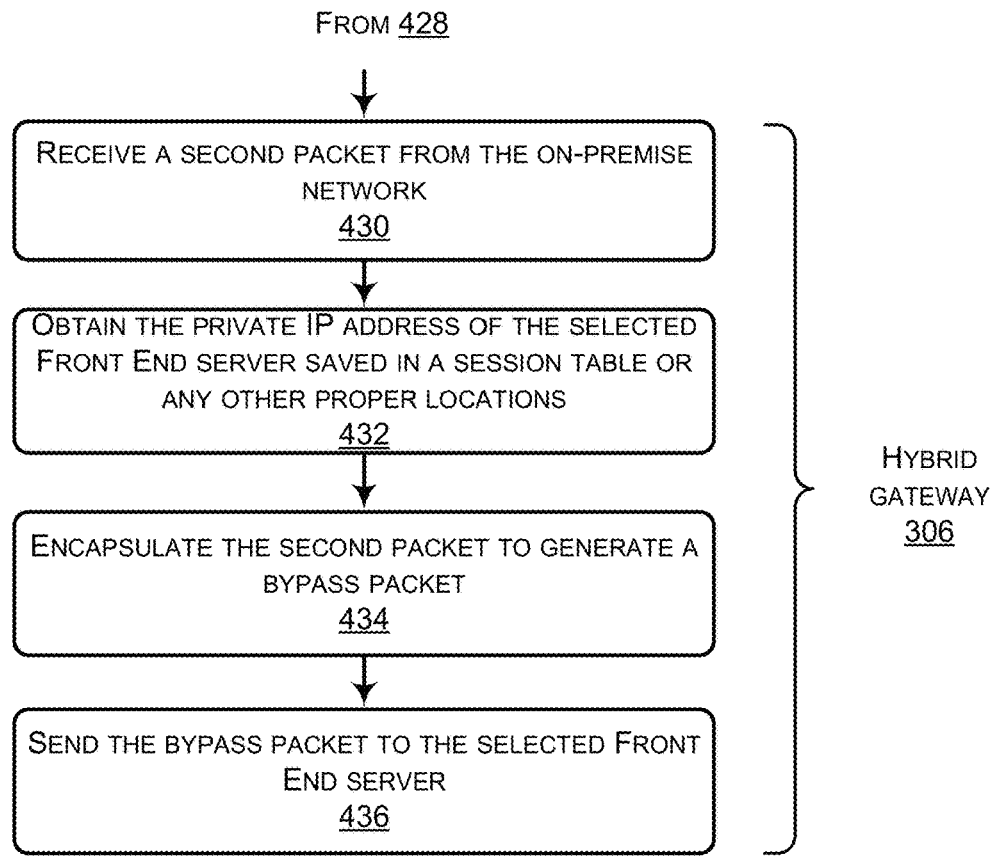

FIGS. 4A-4C illustrate example flowcharts of a process 400 for optimizing network accessing to cloud service. The data flow of the process 400 may be described as below.

At block 402, the hybrid gateway 306 may receive a first packet 304 sent by a hybrid user of the on-premises network 302.

At block 404, the hybrid gateway 306 may perform encapsulation, for example, VXLAN encapsulation on the first packet 304 by adding a first outer header to generate an encapsulated packet 308. Also, the encapsulation of the first packet 304 may be performed based on other protocols or standards.

At block 406, the hybrid gateway 306 may send the encapsulated packet 308 to the SLB 310.

At block 408, the SLB 310 may receive the encapsulated packet 308 from the hybrid gateway 306.

At block 410, The SLB 310 may select a front end server 314 from a plurality of front end servers. The selection of the front end server may be performed randomly or based on any suitable criteria. The selected front end server 314 may have a private IP address, for example, 10.4.1.1. Each front end server FE1, FE2, . . . , FEn may have its own private IP address, for example, 10.4.1.1, 10.4.1.2, . . . , 10.4.1.n.

At block 412, the SLB 310 may perform a destination network address translation (DNAT) on the encapsulated packet 308 by replacing the second destination IP address with a third destination IP address to generate a modified packet 312. The third destination IP address may be the private IP address of the selected front end server 314.

At block 414, the SLB 310 may send the modified packet 312 to the selected front end server 314.

At block 416, the selected front end server 314 may receive the modified packet 312.

At block 418, the selected front end server 314 may generate a response packet 316 based on the modified packet 312. The selected front end server 314 may serve the request of the hybrid user. Also, the response packet 316 may be an empty packet. The response packet 316 may include a second outer header.

At block 420, the selected front end server 314 may send the response packet 316 to the hybrid gateway 306.

At block 422, the hybrid gateway 306 may receive the response packet 316 from the selected front end server 314.

At block 424, the hybrid gateway 306 may remove the second outer header of the response packet 316 to generate a modified response packet 318.

At block 426, the hybrid gateway 306 may save the private IP address of the selected front end server 314 in a session table. Also, the private IP address of the selected front end server 314 may be saved in a memory, a storage device, or any other suitable location.

Additionally or alternatively, the session table may save other information for the hybrid gateway to determine whether other data packets from a user will be sent to this address of the front end server. For example, information about relationship between the user and the frontend server may be set up. A first user may correspond to a first front end server, a second user may correspond to a second server, an $n^{th}$ user may correspond to an $n^{th}$ server, etc., where n may be a positive integer. The session table may be specific to a particular user or may be used for different users. Moreover, the session table may include an entry indicating that a bypass may be made. This entry may be expired after a predetermined period of time or after a predetermined number of packets from the same user are sent, etc. The predetermined period of time and the predetermined number may be set and adjusted as necessary. Under certain conditions, for example, after the predetermined period of time or after the predetermined number of data packets are sent, the load balancing may be performed to make sure the selected frontend server is not overloaded or another server that has no job task is available for the user, etc.

At block 428, the hybrid gateway 306 may forward the modified response packet 318 to the on-premises network 302.

Subsequently, the consecutive packets sent from the hybrid user of the on-premises network 302 may be forwarded from the gateway 306 to the front end server 314 directly without going through the SLB 310, i.e., bypassing the SLB 310. Thus, the process 400 may further include the following.

Referring to FIG. 4C, at block 430, the hybrid gateway 306 may receive a second packet 320 from the on-premises network 302.

At block 432, the hybrid gateway 306 may obtain the private IP address of the selected front end server 314 saved in the session table or any other proper locations.

At block 434, the hybrid gateway 306 may encapsulate the second packet 320 to generate a bypass packet 322 by adding a third outer header. The third outer header may include the third destination IP address which is the private IP address of the selected front end server 314.

At block 436, the hybrid gateway 306 may send the bypass packet 322 to the selected front end server 1144 directly, bypassing the SLB 310.

With the systems and processes discussed herein, the first packet sent from the hybrid user of the on-premises network 302 may be routed through the gateway 306 and the SLB 310. After the SLB 310 selects a front end server 314 from the plurality of front end servers, the private IP address of the front end server 314 may be encapsulated in the response packet 316. Therefore, from the response packet 316 sent from the front end server 314, the hybrid gateway 306 may learn about the private IP address of the selected front end server 314 and may save the private IP address of the selected front end server 314 in a session table. For follow-up packets sent from the on-premises network 302, the hybrid gateway 306 may look up the session table for the private IP address of the selected front end server 314. The hybrid gateway 306 may perform the encapsulation using the private IP address of the selected front end server 314 and forward the packet to the selected front end server 314 directly, bypassing the SLB 310. Therefore, the total capacity of SLBs needed for the traffic between the on-premises network 302 and the cloud service may be reduced. The total network latency may be reduced. The speed of data transmission and thus the speed of processing associated with a user application that depends on the cloud service may be improved. The network robustness for a hybrid user of the on-premises network to access the cloud service may be improved.

Systems and processes discussed herein may also be referred to as Hybrid Fast Bypass (HFB).

FIGS. 5A-5G illustrate formats of various packets shown in FIG. 3.

FIG. 5A illustrates an example diagram showing the format of the first packet 304 in FIG. 3. Referring to FIG. 5A, the first packet 304 may include a first source IP address 502 and a first destination IP address 504. The first source IP address 502 may be a private IP address of the on-premises network 302, for example, 10.1.1.2. The first destination IP address 504 may be the IP address of cloud service, for example, 132.1.1.1.

FIG. 5B illustrates an example diagram showing the format of the encapsulated packet 308 in FIG. 3. Referring to FIG. 5B, the first outer header of the encapsulated packet 308 may include a second source IP address 506, a second destination IP address 508, and a VXLAN ID 510. The second source IP address 506 may be a private IP address of the hybrid gateway 306, for example, 10.0.2.1. The second destination IP address 508 may be the private IP address of SLB 310, for example, 10.3.1.1. The VXLAN ID may be a global unique VXLAN ID representing HFB between the user on-premises network 302 and cloud service. Each such VXLAN ID may be hybrid user specific and varies between the hybrid users. The first source IP address 502 may be a private IP address of the on-premises network 302, for example, 10.1.1.2. The first destination IP address 504 may be the IP address of cloud service, for example, 132.1.1.1.

FIG. 5C illustrates an example diagram showing the format of the modified packet 312 in FIG. 3. Referring to FIG. 5C, the modified packet 312 may include the second source IP address, the third destination IP address 512, VXLAN ID 510, the first source IP address, and the first destination IP address. The second source IP address 506 may be a private IP address of the hybrid gateway 306, for example, 10.0.2.1. The third destination IP address 512 may be the private IP address of selected front end server 314, for example, 10.4.1.1. Each such VXLAN ID may be hybrid user specific and varies between the hybrid users. The first source IP address 502 may be a private IP address of the on-premises network 302, for example, 10.1.1.2. The first destination IP address 504 may be the IP address of cloud service, for example, 132.1.1.1.

FIG. 5D illustrates an example diagram showing the format of the response packet 316 in FIG. 3. Referring to FIG. 5D, the response packet 316 may include a second outer header, the first destination IP address 504, and the first source IP address 502. The second outer header may include a third source IP address 514, a fourth destination IP address 516, and the VXLAN ID 510. The third source IP address 514 may be the private IP address of the front end server 314, for example, 10.4.1.1. The fourth destination IP address 516 may be the private IP address of the hybrid gateway 306, for example, 10.0.2.1. The first destination IP address 504 may be the cloud service IP address, for example, 132.1.1.1. The first source IP address 502 may be the private IP address of the on-premises network 302, for example, 10.1.1.2. All information may be obtained from the modified packet 312 sent from the SLB 310.

FIG. 5E illustrates an example diagram showing the format of the modified response packet 318 in FIG. 3. Referring to FIG. 5E, the modified response packet 318 may include the first destination IP address 504 and the first source IP address 502. The first destination IP address 504 may be the IP address of cloud service, for example, 132.1.1.1. The first source IP address 502 may be the private IP address of the on-premises network 302, for example, 10.1.1.2.

FIG. 5F illustrates an example diagram showing the format of the second packet 320 in FIG. 3. Referring to FIG. 5F, the second packet 320 may include the first source IP address 502 and the first destination IP address 504. The first source IP address 502 may be the private IP address of the on-premises network 302, for example, 10.1.1.2. The first destination IP address 504 may be the IP address of cloud service, for example, 132.1.1.1.

FIG. 5G illustrates an example diagram showing the format of the bypass packet 322 in FIG. 3. Referring to FIG. 5G, the bypass packet 322 may include the third outer header, the first source IP address 502, and the first destination IP address 504. The third outer header may include the second source IP address 506, the third destination IP address 512, and the VXLAN ID 510. The second source IP address 506 may be a private IP address of the hybrid gateway 306, for example, 10.0.2.1. The third destination IP address 512 may be the private IP address of selected front end server 314, for example, 10.4.1.1. Each such VXLAN ID may be hybrid user specific and varies between the hybrid users. The first source IP address 502 may be a private IP address of the on-premises network 302, for example, 10.1.1.2. The first destination IP address 504 may be the IP address of cloud service, for example, 132.1.1.1.

Figure 6:
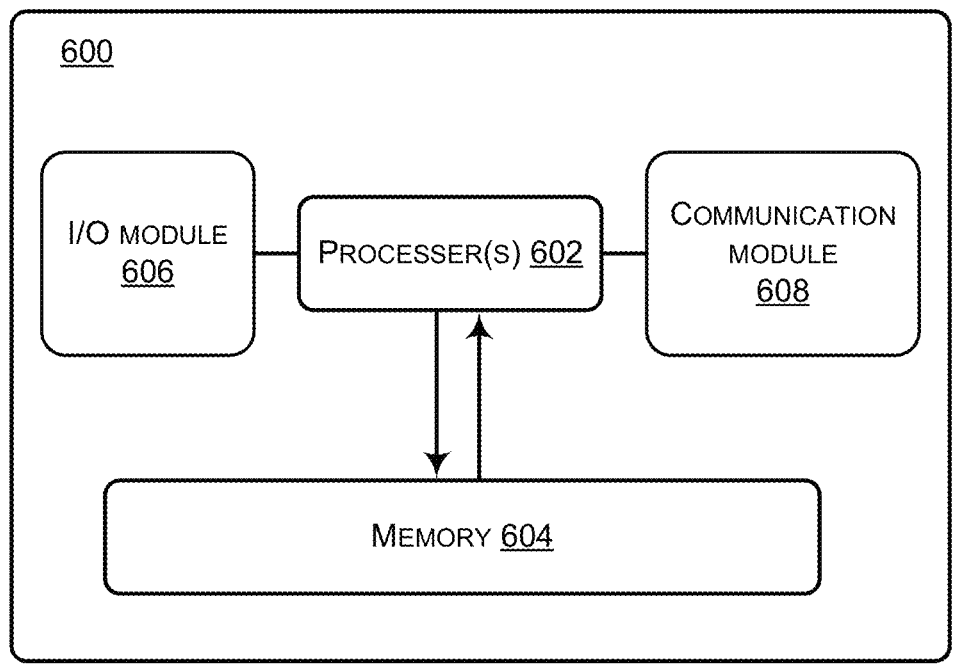
FIG. 6 illustrates an example block diagram of an apparatus for optimizing network accessing to cloud service.

FIG. 6 illustrates an example block diagram of an apparatus 600 for optimizing network accessing to cloud service.

FIG. 6 is only one example of an apparatus 600 and is not intended to suggest any limitation as to the scope of use or functionality of any computing device utilized to perform the processes and/or procedures described above. Other well-known computing devices, apparatuses, environments and/or configurations that may be suitable for use with the embodiments include, but are not limited to, driver/passenger computers, server computers, hand-held or laptop devices, multiprocessor apparatuses, microprocessor-based apparatuses, set-top boxes, game consoles, programmable consumer electronics, network PCs, minicomputers, mainframe computers, distributed computing environments that include any of the above apparatuses or devices, implementations using field programmable gate arrays ("FPGAs") and application specific integrated circuits ("ASICs"), and/or the like.

The apparatus 600 may include one or more processors 602 and memory 604 communicatively coupled to the processor(s) 602. The processor(s) 602 may execute one or more modules and/or processes to cause the processor(s) 602 to perform a variety of functions. In some embodiments, the processor(s) 602 may include a central processing unit (CPU), a graphics processing unit (GPU), both CPU and GPU, or other processing units or components known in the art. Additionally, each of the processor(s) 602 may possess its own local memory, which also may store program modules, program data, and/or one or more operating apparatuses.

Depending on the exact configuration and type of the apparatus 600, the memory 604 may be volatile, such as RAM, non-volatile, such as ROM, flash memory, miniature hard drive, memory card, and the like, or some combination thereof. The memory 604 may include computer-executable instructions that are executable by the processor(s) 602, when executed by the processor(s) 602, cause the processor(s) 602 to implement systems and processes described with reference to FIGS. 1-5G.

The apparatus 600 may additionally include an input/output (I/O) interface 606 for receiving and outputting data. The apparatus 600 may also include a communication module 608 allowing the apparatus 600 to communicate with other devices (not shown) over a network (not shown). The network may include the Internet, wired media such as a wired network or direct-wired connections, and wireless media such as acoustic, radio frequency (RF), infrared, and other wireless media.

With systems and processes discussed herein, only the first packet sent out from the on-premises network needs to go through the SLB to the selected front end server. Any consecutive packets sent from the on-premises network, for example, the seventh packet may be forwarded by the hybrid gateway to the selected front end server directly, without going through the SLB anymore. Therefore, the communication between the on-premises network and the cloud service may impose less traffic load to the SLB. Hence, the total bandwidth needed for SLB may be significantly reduced. Meanwhile, since the follow-up traffic from the on-premises network after the first packet may be communicated directly between the on-premises network and selected front end server of the cloud service, the total network latency may be reduced. Speed of data transmission and thus the speed of processing associated with a user application that depends on the cloud service. The total capacity of SLBs needed for the traffic between the on-premises network and the cloud service may be minimized. The network robustness for a hybrid user of the on-premises network to access the cloud service may be improved.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

1. A method, comprising: receiving a first packet, the first packet including a first source Internet protocol (IP) address and a first destination IP address; adding a first outer header to the first packet to generate an encapsulated packet, the first outer header including a second source IP address and a second destination IP address; forwarding the encapsulated packet to a Server Load Balancer (SLB) associated with the second destination IP address; receiving a response packet from a front end server having a front end server private IP address; and saving the front end server private IP address to bypass the SLB.

Clause 2. The method of clause 1, further comprising: receiving a second packet, the second packet including the first source IP address and the first destination IP address; adding a second outer header to the second packet to generate a bypass packet, the second outer header including a third source IP address and a third destination IP address, the third destination IP address being the front end server private IP address; and forwarding the bypass packet to the front end server associated with the front end server private IP address to bypass the SLB.

Clause 3. The method of clause 1, wherein adding the first outer header to the first packet is performed based on virtual extensible local area network (VXLAN) encapsulation.

Clause 4 The method of clause 3, wherein the first outer header further includes a VXLAN identification (ID), the second source IP address being a hybrid gateway private IP address, the second destination IP address being a SLB private IP address.

Clause 5. The method of clause 1, wherein the first packet is sent from an on-premises network, the first source IP address being a private IP address of the on-premises network, the first destination IP address being an IP address of cloud service.

Clause 6. The method of clause 1, wherein the front end server private IP address is saved in a session table.

Clause 7. The method of clause 2, wherein after forwarding the encapsulated packet to the SLB, the method further comprises: receiving, by the SLB, the encapsulated packet; selecting, by the SLB, the front end server associated with the front end server private IP address; replacing the second destination IP address of the encapsulated packet with the front end server private IP address to generate a modified packet; and forwarding the modified packet to the front end server.

Clause 8. An apparatus, comprising: one or more processors; memory coupled to the one or more processors, the memory storing computer-readable instructions executable by the one or more processors that when executed by the one or more processors, cause the one or more processors to perform acts comprising: receiving a first packet, the first packet including a first source Internet protocol (IP) address and a first destination IP address; adding a first outer header to the first packet to generate an encapsulated packet, the first outer header including a second source IP address and a second destination IP address; forwarding the encapsulated packet to a Server Load Balancer (SLB) associated with the second destination IP address; receiving a response packet from a front end server having a front end server private IP address; and saving the front end server private IP address to bypass the SLB.

Clause 9. The apparatus of clause 8, wherein the acts further comprise: receiving a second packet, the second packet including the first source IP address and the first destination IP address; adding a second outer header to the second packet to generate a bypass packet, the second outer header including a third source IP address and a third destination IP address, the third destination IP address being the front end server private IP address; and forwarding the bypass packet to the front end server associated with the front end server private IP address to bypass the SLB.

Clause 10. The apparatus of clause 8, wherein adding the first outer header to the first packet is performed based on virtual extensible local area network (VXLAN) encapsulation.

Clause 11. The apparatus of clause 10, wherein the first outer header further includes a VXLAN identification (ID), the second source IP address being a hybrid gateway private IP address, the second destination IP address being a SLB private IP address.

Clause 12. The apparatus of clause 8, wherein the first packet is sent from an on-premises network, the first source IP address being a private IP address of the on-premises network, the first destination IP address being an IP address of cloud service.

Clause 13. The apparatus of clause 8, wherein the front end server private IP address is saved in a session table.

Clause 14. The apparatus of clause 9, wherein after forwarding the encapsulated packet to the SLB, the method further comprises: receiving, by the SLB, the encapsulated packet; selecting, by the SLB, the front end server associated with the front end server private IP address; replacing the second destination IP address of the encapsulated packet with the front end server private IP address to generate a modified packet; and forwarding the modified packet to the front end server.

Clause 15. A computer-readable storage medium storing computer-readable instructions executable by one or more processors, that when executed by the one or more processors, cause the one or more processors to perform acts comprising: receiving a first packet, the first packet including a first source Internet protocol (IP) address and a first destination IP address; adding a first outer header to the first packet to generate an encapsulated packet, the first outer header including a second source IP address and a second destination IP address; forwarding the encapsulated packet to a Server Load Balancer (SLB) associated with the second destination IP address; receiving a response packet from a front end server having a front end server private IP address; and saving the front end server private IP address to bypass the SLB.

Clause 16. The computer-readable storage medium of clause 15, wherein the acts further comprise: receiving a second packet, the second packet including the first source IP address and the first destination IP address; adding a second outer header to the second packet to generate a bypass packet, the second outer header including a third source IP address and a third destination IP address, the third destination IP address being the front end server private IP address; and forwarding the bypass packet to the front end server associated with the front end server private IP address to bypass the SLB.

Clause 17. The computer-readable storage medium of clause 15, wherein adding the first outer header to the first packet is performed based on virtual extensible local area network (VXLAN) encapsulation.

Clause 18. The computer-readable storage medium of clause 17, wherein the first outer header further includes a VXLAN identification (ID), the second source IP address being a hybrid gateway private IP address, the second destination IP address being a SLB private IP address.

Clause 19. The computer-readable storage medium of clause 15, the first packet is sent from an on-premises network, the first source IP address being a private IP address of the on-premises network, the first destination IP address being an IP address of cloud service.

Clause 20. The computer-readable storage medium of clause 15, wherein the front end server private IP address is saved in a session table.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving, by a hybrid gateway, a first packet, the first packet including a first source Internet protocol (IP) address and a first destination IP address;
   adding, by the hybrid gateway, a first outer header to the first packet to generate an encapsulated packet, the first outer header including a second source IP address and a second destination IP address;
   forwarding, by the hybrid gateway, the encapsulated packet to a Server Load Balancer (SLB) associated with the second destination IP address;
   receiving, by the hybrid gateway, a response packet directly from a front end server having a front end server private IP address;
   saving, by the hybrid gateway, the front end server private IP address to bypass the SLB;
   receiving, by the hybrid gateway, a second packet, the second packet including the first source IP address and the first destination IP address;
   adding, by the hybrid gateway, a second outer header to the second packet to generate a bypass packet, the second outer header including a third source IP address and a third destination IP address, the third destination IP address being the front end server private IP address; and
   forwarding, by the hybrid gateway, the bypass packet to the front end server associated with the front end server private IP address to bypass the SLB.

2. The method of claim 1, wherein adding the first outer header to the first packet is performed based on virtual extensible local area network (VXLAN) encapsulation.

3. The method of claim 2, wherein the first outer header further includes a VXLAN identification (ID), the second source IP address being a hybrid gateway private IP address, the second destination IP address being a SLB private IP address.

4. The method of claim 1, wherein the first packet is sent from an on-premises network, the first source IP address being a private IP address of the on-premises network, the first destination IP address being an IP address of cloud service.

5. The method of claim 1, wherein the front end server private IP address is saved in a session table.

6. The method of claim 1, wherein after forwarding the encapsulated packet to the SLB, the method further comprises:
receiving, by the SLB, the encapsulated packet;
selecting, by the SLB, the front end server associated with the front end server private IP address;
replacing the second destination IP address of the encapsulated packet with the front end server private IP address to generate a modified packet; and
forwarding the modified packet to the front end server.

7. An apparatus, comprising:
one or more processors;
memory coupled to the one or more processors, the memory storing computer-readable instructions executable by the one or more processors that when executed by the one or more processors, cause the one or more processors to perform acts comprising:
receiving, by a hybrid gateway, a first packet, the first packet including a first source Internet protocol (IP) address and a first destination IP address;
adding, by the hybrid gateway, a first outer header to the first packet to generate an encapsulated packet, the first outer header including a second source IP address and a second destination IP address;
forwarding, by the hybrid gateway, the encapsulated packet to a Server Load Balancer (SLB) associated with the second destination IP address;
receiving, by the hybrid gateway, a response packet directly from a front end server having a front end server private IP address;
saving, by the hybrid gateway, the front end server private IP address to bypass the SLB;
receiving, by the hybrid gateway, a second packet, the second packet including the first source IP address and the first destination IP address;
adding, by the hybrid gateway, a second outer header to the second packet to generate a bypass packet, the second outer header including a third source IP address and a third destination IP address, the third destination IP address being the front end server private IP address; and
forwarding, by the hybrid gateway, the bypass packet to the front end server associated with the front end server private IP address to bypass the SLB.

8. The apparatus of claim 7, wherein adding the first outer header to the first packet is performed based on virtual extensible local area network (VXLAN) encapsulation.

9. The apparatus of claim 8, wherein the first outer header further includes a VXLAN identification (ID), the second source IP address being a hybrid gateway private IP address, the second destination IP address being a SLB private IP address.

10. The apparatus of claim 7, wherein the first packet is sent from an on-premises network, the first source IP address being a private IP address of the on-premises network, the first destination IP address being an IP address of cloud service.

11. The apparatus of claim 7, wherein the front end server private IP address is saved in a session table.

12. The apparatus of claim 7, wherein after forwarding the encapsulated packet to the SLB, the method further comprises:
receiving, by the SLB, the encapsulated packet;
selecting, by the SLB, the front end server associated with the front end server private IP address;
replacing the second destination IP address of the encapsulated packet with the front end server private IP address to generate a modified packet; and
forwarding the modified packet to the front end server.

13. A computer-readable storage medium storing computer-readable instructions executable by one or more processors, that when executed by the one or more processors, cause the one or more processors to perform acts comprising:
receiving, by a hybrid gateway, a first packet, the first packet including a first source Internet protocol (IP) address and a first destination IP address;
adding, by the hybrid gateway, a first outer header to the first packet to generate an encapsulated packet, the first outer header including a second source IP address and a second destination IP address;
forwarding, by the hybrid gateway, the encapsulated packet to a Server Load Balancer (SLB) associated with the second destination IP address;
receiving, by the hybrid gateway, a response packet directly from a front end server having a front end server private IP address;
saving, by the hybrid gateway, the front end server private IP address to bypass the SLB;
receiving, by the hybrid gateway, a second packet, the second packet including the first source IP address and the first destination IP address;
adding, by the hybrid gateway, a second outer header to the second packet to generate a bypass packet, the second outer header including a third source IP address and a third destination IP address, the third destination IP address being the front end server private IP address; and
forwarding, by the hybrid gateway, the bypass packet to the front end server associated with the front end server private IP address to bypass the SLB.

14. The computer-readable storage medium of claim 13, wherein adding the first outer header to the first packet is performed based on virtual extensible local area network (VXLAN) encapsulation.

15. The computer-readable storage medium of claim 14, wherein the first outer header further includes a VXLAN identification (ID), the second source IP address being a hybrid gateway private IP address, the second destination IP address being a SLB private IP address.

16. The computer-readable storage medium of claim 13, the first packet is sent from an on-premises network, the first source IP address being a private IP address of the on-premises network, the first destination IP address being an IP address of cloud service.

17. The computer-readable storage medium of claim 13, wherein the front end server private IP address is saved in a session table.

* * * * *